(12) United States Patent
Yoneyama

(10) Patent No.: US 10,732,408 B2
(45) Date of Patent: Aug. 4, 2020

(54) PROJECTION TYPE DISPLAY DEVICE AND PROJECTION DISPLAY METHOD

(71) Applicant: FUJIFILM Corporation, Minato-ku, Tokyo (JP)

(72) Inventor: Kazuya Yoneyama, Saitama (JP)

(73) Assignee: FUJIFILM Corporation, Tokyo (JP)

(*) Notice: Subject to any disclaimer, the term of this patent is extended or adjusted under 35 U.S.C. 154(b) by 66 days.

(21) Appl. No.: 15/707,241

(22) Filed: Sep. 18, 2017

(65) Prior Publication Data
US 2018/0024359 A1 Jan. 25, 2018

Related U.S. Application Data

(63) Continuation of application No. PCT/JP2015/082448, filed on Nov. 18, 2015.

(30) Foreign Application Priority Data

Mar. 19, 2015 (JP) .................................. 2015-056436

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60K 37/02* (2013.01);
(Continued)

(58) Field of Classification Search
CPC .......... B60K 35/00; B60K 37/02; H04N 5/74; G02B 27/0101; G02B 27/104;
(Continued)

(56) References Cited

U.S. PATENT DOCUMENTS

| 9,329,388 B1* | 5/2016 | Amirparviz ........... G02B 5/1842 |
| 2003/0169213 A1* | 9/2003 | Spero ........................ G02B 5/20 345/7 |

(Continued)

FOREIGN PATENT DOCUMENTS

| DE | 102012204303 A1 | 9/2013 |
| DE | 102013219376 A1 | 4/2014 |

(Continued)

OTHER PUBLICATIONS

Search Report dated Sep. 2, 2016, issued by the International Searching Authority in counterpart International Patent Application No. PCT/JP2015/082448 (PCT/ISA/210).

(Continued)

*Primary Examiner* — Towfiq Elahi
(74) *Attorney, Agent, or Firm* — Sughrue Mion, PLLC

(57) ABSTRACT

A projection type display device includes: a first light source that emits visible light; a projection receiving member which is disposed on a windshield of a vehicle, to which an image based on the visible light is projected; a second light source that emits ultraviolet light which decreases a light transmittance of the projection receiving member by irradiation of the projection receiving member; a projection unit that projects the visible light emitted from the first light source and the ultraviolet light emitted from the second light source to the projection receiving member; an imaging unit that performs imaging of a scene at front of the windshield of the vehicle; and a detection unit that detects an object image having brightness greater than or equal to a first threshold as defined herein, and the projection unit projects the ultraviolet light as defined herein.

18 Claims, 5 Drawing Sheets

(51) Int. Cl.
| | |
|---|---|
| G02B 27/10 | (2006.01) |
| H04N 9/31 | (2006.01) |
| G09G 3/02 | (2006.01) |
| G09G 5/377 | (2006.01) |
| G03B 21/10 | (2006.01) |
| B60K 37/02 | (2006.01) |
| G03B 21/60 | (2014.01) |
| G09G 3/34 | (2006.01) |
| G02B 27/14 | (2006.01) |

(52) U.S. Cl.
CPC .......... *G02B 27/01* (2013.01); *G02B 27/104* (2013.01); *G02B 27/1066* (2013.01); *G03B 21/10* (2013.01); *G03B 21/60* (2013.01); *G09G 3/02* (2013.01); *G09G 5/377* (2013.01); *H04N 9/3164* (2013.01); *H04N 9/3185* (2013.01); *H04N 9/3194* (2013.01); *B60K 2370/33* (2019.05); *B60K 2370/334* (2019.05); *G02B 27/141* (2013.01); *G02B 27/149* (2013.01); *G02B 2027/014* (2013.01); *G02B 2027/0118* (2013.01); *G02B 2027/0141* (2013.01); *G09G 3/3413* (2013.01); *G09G 2320/0626* (2013.01); *G09G 2360/16* (2013.01)

(58) Field of Classification Search
CPC .... G02B 27/1066; G02B 27/01; G03B 21/60; G03B 21/10
See application file for complete search history.

(56) References Cited

U.S. PATENT DOCUMENTS

| | | | |
|---|---|---|---|
| 2008/0238814 | A1 | 10/2008 | Ishikawa et al. |
| 2009/0141496 | A1* | 6/2009 | Yamamoto ........... G02B 26/123 |
| | | | 362/259 |
| 2010/0066925 | A1 | 3/2010 | Nagahara et al. |

FOREIGN PATENT DOCUMENTS

| | | |
|---|---|---|
| JP | 5-18948 U | 3/1993 |
| JP | 2007-276766 A | 10/2007 |
| JP | 2008-268883 | 11/2008 |
| JP | 2008-290527 A | 12/2008 |
| JP | 2009-139940 A | 6/2009 |
| JP | 2009-269490 A | 11/2009 |
| JP | 2010-146179 A | 7/2010 |
| JP | 2010-188826 A | 9/2010 |
| JP | 2013-119268 A | 6/2013 |
| JP | 2014-201197 A | 10/2014 |
| WO | 2014/162182 A1 | 10/2014 |

OTHER PUBLICATIONS

Written Opinion dated Sep. 2, 2016, issued by the International Searching Authority in counterpart International Patent Application No. PCT/JP2015/082448 (PCT/ISA/237).

International Preliminary Report on Patentability dated Oct. 6, 2016 issued by the International Searching Authority in counterpart International Patent Application No. PCT/JP2015/082448 (PCT/IPEA/409).

Communication dated Aug. 3, 2018, issued by the German Patent and Trademark Office in counterpart German Patent Application No. DG132101.

* cited by examiner

PROJECTION TYPE DISPLAY DEVICE AND PROJECTION DISPLAY METHOD

CROSS REFERENCE TO RELATED APPLICATION

This is a continuation of International Application No. PCT/JP2015/082448 filed on Nov. 18, 2015, and claims priority from Japanese Patent Application No. 2015-056436 filed on Mar. 19, 2015, the entire disclosures of which are incorporated herein by reference.

BACKGROUND OF THE INVENTION

1. Field of the Invention

The present invention relates to a projection type display device and a projection display method.

2. Description of the Related Art

Known is a vehicle head-up display (HUD) device that uses, as a screen, a combiner arranged on a windshield or near the front of a windshield of a vehicle such as an automobile, a streetcar, a heavy machine, an agricultural machine, an aircraft, or a watercraft and projects projection light to the screen to display an image (refer to JP2007-276766A, JP2008-268883A, and JP2014-201197A). According to this HUD, a user can visually recognize the image, which is displayed on the windshield or the like by the projection light projected from the HUD, as a virtual image in an overlaid manner on a front scene of the vehicle on the windshield side.

In JP2007-276766A, disclosed is an HUD that includes means for extracting a view field image of a predetermined range of the field of view of an operator from an image of the front of the vehicle imaged by a monitoring camera and detecting, based on the brightness of the view field image, whether or not eyes of the operator are irradiated with strong external light.

In JP2008-268883A, disclosed is an HUD that changes the angle of a lens included in an optical system to block reflective light in order to prevent influence of external light such as sunlight reflected by the optical system on the visibility of a displayed image.

In JP2014-201197A, disclosed is an HUD that, based on position information of the sun, position and direction information of the vehicle, and viewpoint information of the operator, displays images in a position where influence of the glare of the sun is reduced.

SUMMARY OF THE INVENTION

While the HUDs disclosed in JP2007-276766A and JP2014-201197A change an image display position by detecting the state of irradiation of the eyes of the operator with strong external light, an anti-glare technology that directly prevents high brightness external light such as sunlight or a headlight of an oncoming car from entering the eyes of the operator is not disclosed in JP2007-276766A and JP2014-201197A.

In the HUD disclosed in JP2008-268883A, while a technology of preventing influence of external light reflected by the lens in the device on the visibility of the displayed image is disclosed, an anti-glare technology that directly prevents high brightness external light from entering the eyes of the operator is not disclosed.

The present invention is conceived in view of the above matter, and an object thereof is to provide a projection type display device and a projection display method that can prevent high brightness external light from entering eyes of an operator without hindering the front field of view of the operator of a vehicle.

A projection type display device of the present invention comprises a first light source and a second light source, a projection unit that projects light, of light emitted from the first light source, corresponding to image information and light of a specific wavelength emitted from the second light source to a projection receiving member which is disposed on a windshield of a vehicle and of which the light transmittance is decreased by irradiation with the light of the specific wavelength, and a detection unit that detects an object image having brightness greater than or equal to a first threshold from a part, of captured image data acquired by imaging by an imaging unit which performs imaging in a traveling direction of the vehicle, corresponding to a range where the projection receiving member is disposed, in which the projection unit projects the light of the specific wavelength to at least a part of a region of the projection receiving member that corresponds to the object image detected by the detection unit.

A projection display method of the present invention comprises a projection step of projecting light, of light emitted from a first light source, corresponding to image information and light of a specific wavelength emitted from a second light source to a projection receiving member which is disposed on a windshield of a vehicle and of which the light transmittance is decreased by irradiation with the light of the specific wavelength, and a detection step of detecting an object image having brightness greater than or equal to a first threshold from a part, of captured image data acquired by imaging by an imaging unit which performs imaging in a traveling direction of the vehicle, corresponding to a range where the projection receiving member is disposed, in which in the projection step, the light of the specific wavelength is projected to at least a part of a region of the projection receiving member that corresponds to the object image detected in the detection step.

According to the present invention, it is possible to provide a projection type display device and a projection display method that can prevent high brightness external light from entering eyes of an operator without hindering the front field of view of the operator of a vehicle.

EXPLANATION OF REFERENCES

Figure 1:
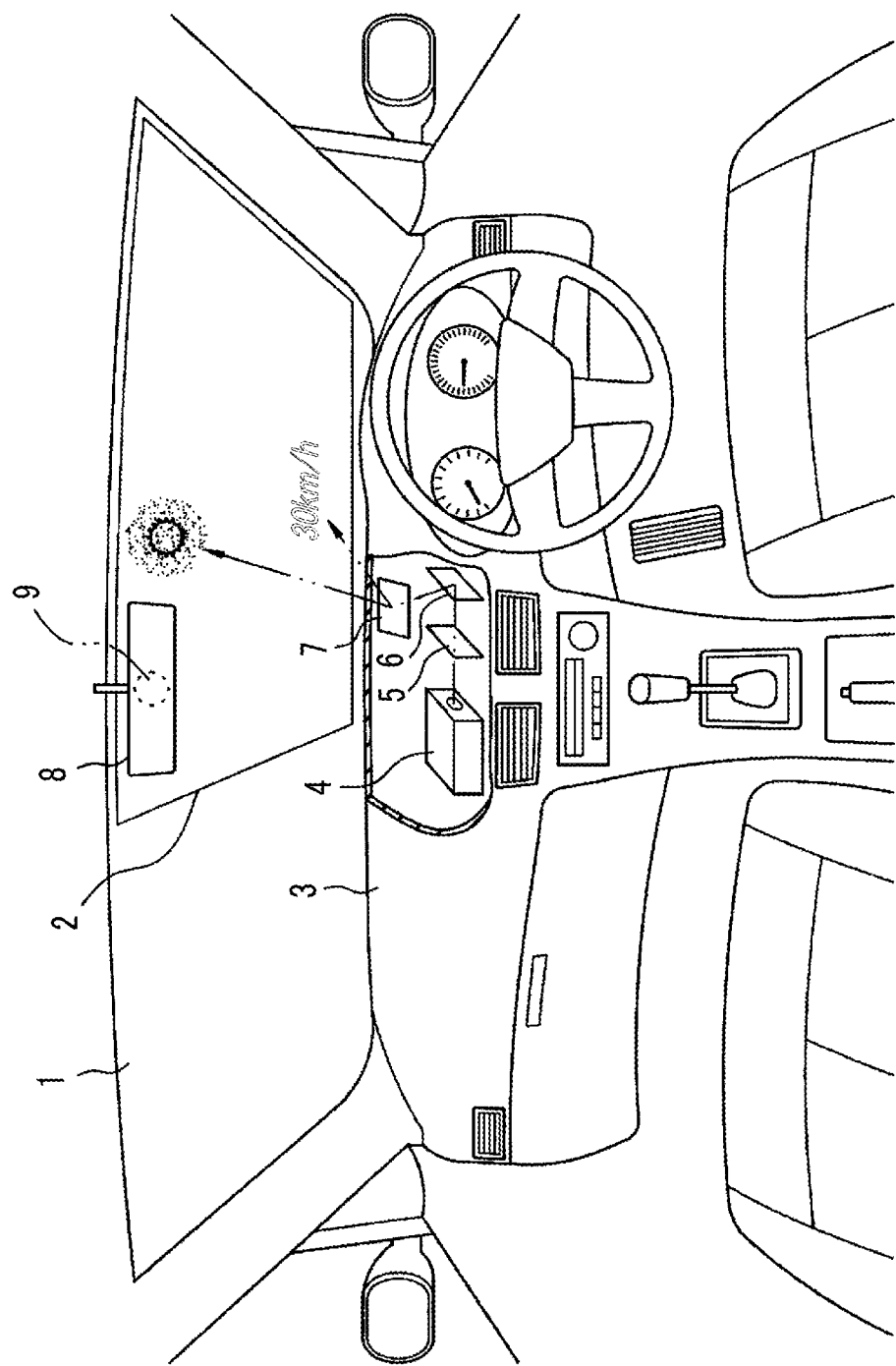
FIG. 1 is a conceptual diagram illustrating a configuration of an HUD that is one embodiment of a projection type display device of the present invention.

2: combiner
9: imaging unit
40: first light source unit

45: first drive unit
46: projection optical system
50: second light source unit
55: second drive unit
60: system control unit
61: captured image data acquisition unit
62: projection data generation unit
63: object image detection unit

DESCRIPTION OF THE PREFERRED EMBODIMENTS

Hereinafter, an embodiment of the present invention will be described with reference to the drawings.

FIG. 1 is a diagram illustrating a schematic configuration of an HUD that is one embodiment of a projection type display device of the present invention. While the HUD is used as being mounted in an automobile, the HUD can be mounted in a vehicle other than an automobile, such as a streetcar, a heavy machine, an agricultural machine, an aircraft, or a watercraft.

The HUD illustrated in FIG. 1 includes a combiner 2 that is a projection receiving member bonded to the inner surface or the outer surface of a windshield 1 of the automobile; a light source section 4 that is incorporated in a dashboard 3; a diffusion plate 5, a reflective mirror 6, and a magnifying glass 7 that are also incorporated in the dashboard 3; and an imaging unit 9 that is attached to the inner side of a rearview mirror 8 above the windshield 1.

The diffusion plate 5 changes light emitted from the light source section 4 into plane light by diffusing the light. The reflective mirror 6 reflects, to the magnifying glass 7 side, the light that is changed into plane light by the diffusion plate 5. The magnifying glass 7 enlarges the reflective light and projects the reflective light to the combiner 2 which is the projection receiving member.

The combiner 2 is the projection receiving member to which the visible light projected from the magnifying glass 7 is projected. An operator of the automobile can visually recognize information such as a picture or a character related to operation by seeing the visible light that is projected to the combiner 2 and reflected. The combiner 2 has a function of transmitting visible light from the outside of the windshield 1 (outer world). Thus, the operator can visually recognize an image in which the image (virtual image) based on the visible light projected from the magnifying glass 7 is overlaid on a scene of the outer world.

The imaging unit 9 attached to the rearview mirror 8 images a scene at the front (in the traveling direction of the automobile) of the windshield 1 and is connected to the light source section 4 in a wired or wireless manner. Captured image data of the scene in the traveling direction of the automobile acquired in the imaging unit 9 is transferred to the light source section 4 in a wired or wireless manner.

The imaging unit 9 may be dedicated to the HUD or may be an imaging unit that is mounted in the automobile for other purposes such as a collision prevention system. The imaging unit 9 may be attached to a place other than the rearview mirror 8 such as the dashboard 3 or near a headlight of the automobile.

The imaging range of the imaging unit 9 is set to include all outer world images that are seen through the combiner 2 from the operator. The captured image data that is acquired by imaging by the imaging unit 9 includes parts corresponding to the outer world images. That is, at least a part of the captured image data corresponds to the range in which the combiner 2 is disposed.

The combiner 2 bonded to the windshield 1 includes a thin film layer of a photochromic compound that is coated on one surface of a base material configured of a transparent resin. The photochromic compound is a substance that exhibits a characteristic such that the light transmittance thereof is decreased by irradiation with light of a specific wavelength and is not changed by irradiation with visible light. The photochromic compound can be used by, for example, being dispersed in the transparent resin in addition to being coated on one surface of the transparent resin constituting the base material of the combiner 2. Alternatively, the photochromic compound may be bonded as a film shape to the transparent resin constituting the base material.

The photochromic compound suitably used in the combiner 2 of the HUD can be exemplified by a cross-linked hexaarylbisimidazole having a [2,2]paracyclopane skeleton (pseudogem-Bis(diphenylimidazole)[2,2]paracyclophane). This photochromic compound is typically colorless and exhibits a rapid color changing characteristic such that the photochromic compound is changed to blue if being irradiated with ultraviolet light of a wavelength of around 355 nm and is instantaneously decolorized if irradiation with ultraviolet light is stopped.

Another example of the photochromic compound can be exemplified by pseudogem-Bis(3,3',4,4'-tetramethoxydiphenylimidazole)[2,2]paracyclophane. This photochromic compound is typically colorless and exhibits a rapid color changing characteristic such that the photochromic compound is changed to green if being irradiated with ultraviolet light and is instantaneously decolorized if irradiation with ultraviolet light is stopped.

Thus, the combiner 2 coated with the thin film layer of the photochromic compound exhibits a high light transmittance for visible light incident on the windshield 1 from the outer world, and only when the combiner 2 is irradiated with light of a specific wavelength, the light transmittance of a part to which the light is projected is decreased.

Therefore, when high brightness external light having high brightness such as sunlight or a headlight of an oncoming car is incident on the windshield 1, it is possible to prevent the high brightness external light from entering eyes of the operator without hindering the front field of view of the operator, by irradiating a range, in the combiner 2, positioned on a line connecting an object emitting the high brightness external light (high brightness object) and the eyes of the operator with light of a specific wavelength (for example, ultraviolet light) to locally decrease the light transmittance of the range irradiated with ultraviolet light.

Figure 2:
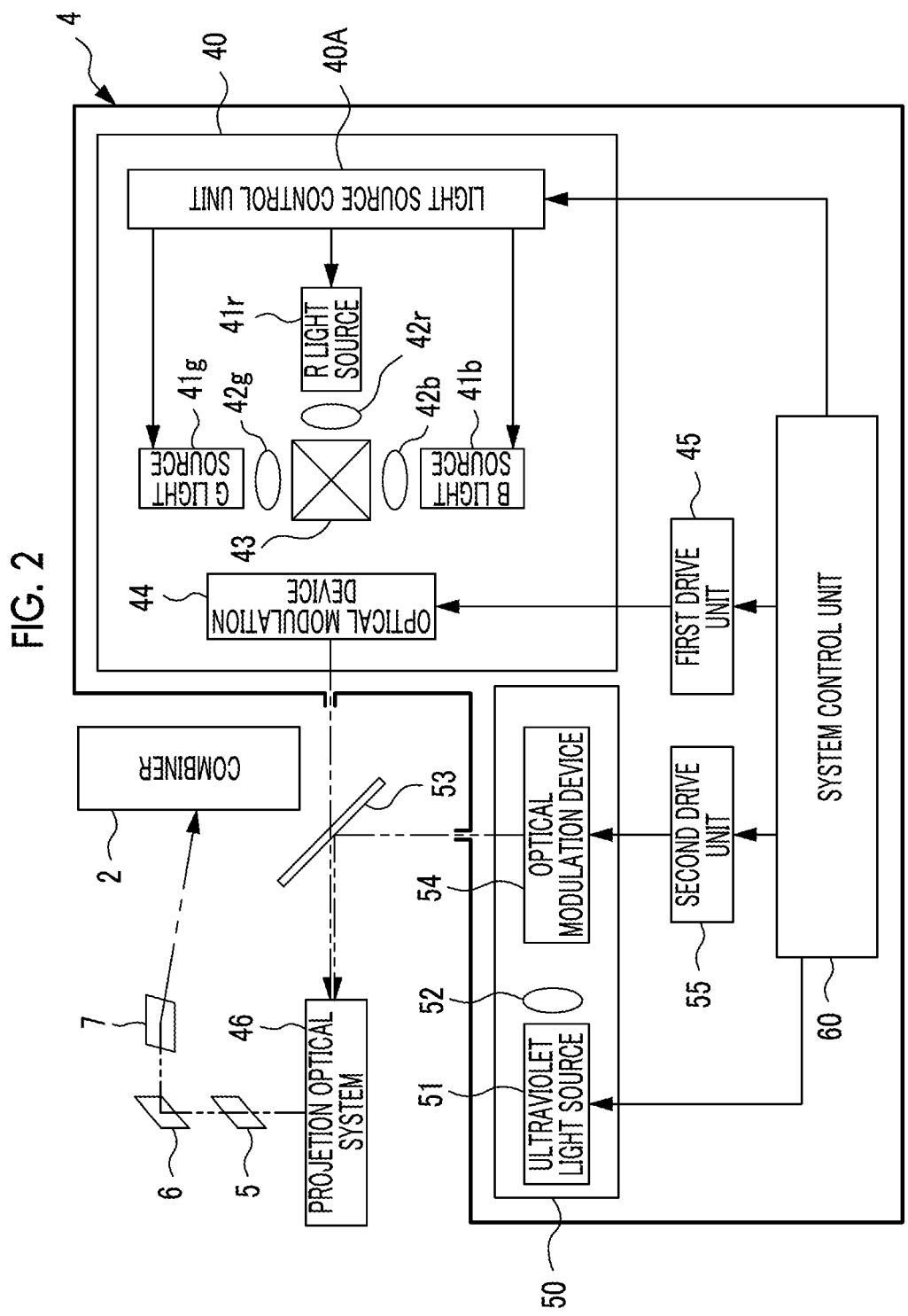
FIG. 2 is a block diagram illustrating a specific configuration example of the HUD illustrated in FIG. 1.

FIG. 2 is a schematic diagram illustrating a detailed configuration example of the HUD illustrated in FIG. 1.

The light source section 4 of the HUD includes a first light source unit 40 that includes an R light source 41r, a G light source 41g, and a B light source 41b constituting a first light source emitting visible light; a first drive unit 45 that drives an optical modulation device 44 included in the first light source unit 40; a second light source unit 50 that includes an ultraviolet light source 51 which is a second light source emitting ultraviolet light as the above light of a specific wavelength; a second drive unit 55 that drives an optical modulation device 54 included in the second light source unit 50; and a system control unit 60 that controls the entirety of the light source section 4.

The first light source unit 40 includes a light source control unit 40A, the R light source 41r that is a red light source emitting red light, the G light source 41g that is a green light source emitting green light, the B light source 41b that is a blue light source emitting blue light, a dichroic prism 43, a collimator lens 42r that is disposed between the R light source 41r and the dichroic prism 43, a collimator lens 42g that is disposed between the G light source 41g and the dichroic prism 43, a collimator lens 42b that is disposed between the B light source 41b and the dichroic prism 43, and the optical modulation device 44.

The dichroic prism 43 is an optical member for guiding light emitted from each of the R light source 41r, the G light source 41g, and the B light source 41b onto the same optical path. That is, the dichroic prism 43 transmits and emits red light collimated by the collimator lens 42r to the optical modulation device 44. In addition, the dichroic prism 43 reflects and emits green light collimated by the collimator lens 42g to the optical modulation device 44. Furthermore, the dichroic prism 43 reflects and emits blue light collimated by the collimator lens 42b to the optical modulation device 44. The optical member that has such a function is not limited to a dichroic prism. For example, a cross dichroic mirror may be used.

Each of the R light source 41r, the G light source 41g, and the B light source 41b uses a light emitting device such as a laser and a light emitting diode (LED). While the present embodiment illustrates the HUD that includes three light sources of the R light source 41r, the G light source 41g, and the B light source 41b as a light source of the first light source unit 40, the number of light sources may be two or greater than or equal to four.

The light source control unit 40A sets predetermined emitted light intensity patterns for the intensities of emitted light of each of the R light source 41r, the G light source 41g, and the B light source 41b and controls the R light source 41r, the G light source 41g, and the B light source 41b to emit light in order in accordance with the emitted light intensity patterns.

The optical modulation device 44 modulates light emitted from the dichroic prism 43 and emits, to a dichroic mirror 53, light that corresponds to projected image data (red image light, blue image light, and green image light) which is image information.

For example, a liquid crystal on silicon (LCOS), a digital micromirror device (DMD), a micro electro mechanical systems (MEMS) device, and a liquid crystal display device can be used as the optical modulation device 44.

The first drive unit 45 drives the optical modulation device 44 in accordance with the projected image data input from the system control unit 60 and causes light corresponding to the projected image data (red image light, blue image light, and green image light) to be emitted to the dichroic mirror 53.

The second light source unit 50 includes the ultraviolet light source 51 that emits ultraviolet light of a wavelength of around 355 nm, a collimator lens 52 that collimates the ultraviolet light emitted from the ultraviolet light source 51, and the optical modulation device 54 that modulates the ultraviolet light emitted from the collimator lens 52 in accordance with anti-glare image data and emits the modulated ultraviolet light to the dichroic mirror 53. The ultraviolet light source 51 uses a light emitting device such as a laser and an LED.

The second drive unit 55 drives the optical modulation device 54 in accordance with the anti-glare image data input from the system control unit 60 and causes ultraviolet light corresponding to the anti-glare image data to be emitted to the dichroic mirror 53.

The dichroic mirror 53 has a characteristic of transmitting visible light and reflecting ultraviolet light. Visible light transmitted by the dichroic mirror 53 and ultraviolet reflected by the dichroic mirror 53 are incident on a projection optical system 46.

The projection optical system 46 is an optical system for projecting visible light emitted from the optical modulation device 44 of the first light source unit 40 and ultraviolet light emitted from the optical modulation device 54 of the second light source unit 50 to the diffusion plate 5 illustrated in FIG. 1. This optical system can use not only a lens but also a scanner. For example, visible light and ultraviolet light emitted from a scan type scanner may be diffused by the diffusion plate 5 and changed into plane light.

The system control unit 60 controls the first light source unit 40, the second light source unit 50, the first drive unit 45, the second drive unit 55, and the ultraviolet light source 51.

The optical modulation device 44, the first drive unit 45, the optical modulation device 54, the second drive unit 55, the dichroic mirror 53, the projection optical system 46, the diffusion plate 5, the reflective mirror 6, the magnifying glass 7, and the system control unit 60 constitute a projection unit that projects light corresponding to the image information emitted from the first light source unit 40 and light of a specific wavelength emitted from the second light source unit 50 to the combiner 2 which is the projection receiving member.

Figure 3:
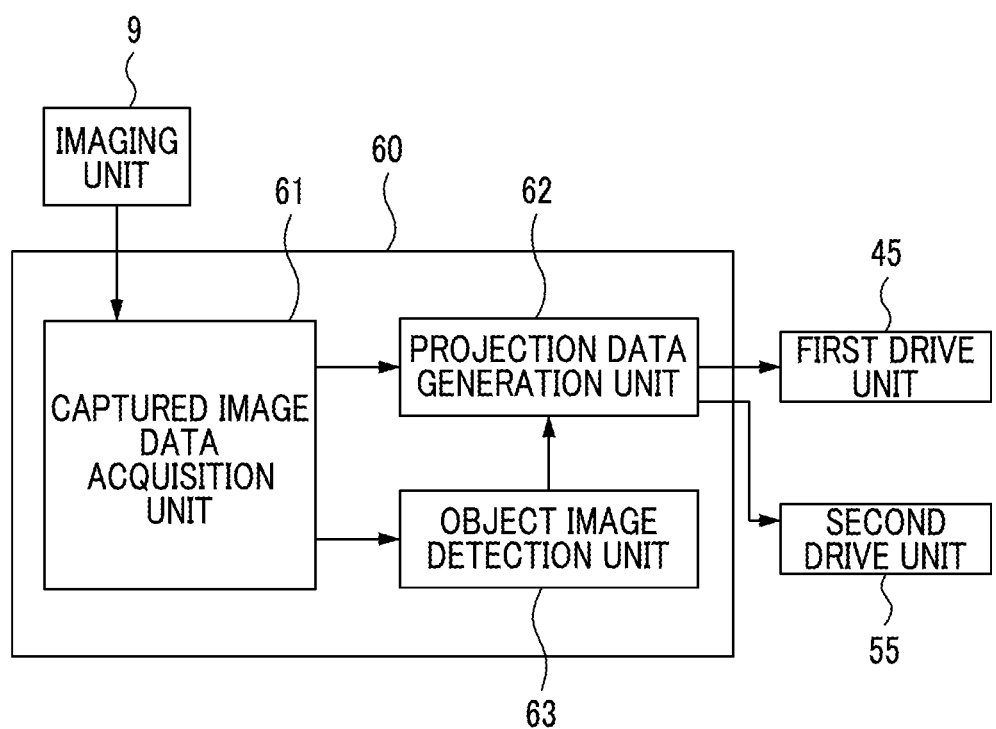
FIG. 3 is a diagram illustrating functional blocks of a system control unit 60 of the HUD illustrated in FIG. 1.

FIG. 3 is a diagram illustrating functional blocks of the system control unit 60. As illustrated in FIG. 3, the system control unit 60 includes a captured image data acquisition unit 61, a projection data generation unit 62, and an object image detection unit 63 as a detection unit.

The captured image data acquisition unit 61 acquires the captured image data, which is acquired by imaging in the imaging unit 9 illustrated in FIG. 1, and outputs the captured image data to the projection data generation unit 62 and the object image detection unit 63.

The projection data generation unit 62 analyzes, by a known image analysis process, the captured image data acquired by the captured image data acquisition unit 61 and generates first projected image data. Specifically, the projection data generation unit 62 detects an obstacle or a dangerous object such as a pedestrian, a power pole, a street tree, or a vehicle accident from the captured image data. The projection data generation unit 62, in the case of detecting an obstacle or a dangerous object, generates the first projected image data for reporting the detected obstacle or the dangerous object. The projection data generation unit 62 outputs the first projected image data to the first drive unit 45.

The captured image data corresponds to the scene at the front of the windshield 1. At least a part of the captured image data corresponds to an outer world image that is seen through the combiner 2 from the operator. In addition, a relationship between an activated pixel (the state of emitting light to the projection optical system 46 by reflection or transmission) of the optical modulation device 44 of the first light source unit 40 and a region of the combiner 2 to which the image is projected is predetermined. Thus, if the region of the obstacle or the dangerous object detected from the captured image data is known, the projected image data to be output to the first drive unit 45 can be determined.

The projection data generation unit 62 generates second projected image data for displaying guide information for the traveling speed of the automobile and navigation to the destination and inputs the second projected image data into the first drive unit 45.

The first drive unit 45 drives the optical modulation device 44 in accordance with the first projected image data and the second projected image data input from the projection data generation unit 62 to project, to the combiner 2, visible light that is based on the first projected image data and the second projected image data.

The object image detection unit 63 detects an object image of brightness greater than or equal to a first threshold (hereinafter, referred to as a high brightness object image) from a part, of the captured image data acquired by the captured image data acquisition unit 61, that corresponds to the range where the combiner 2 is disposed.

The object image means a region on the captured image data that has an area of greater than or equal to a predetermined size. The object image detection unit 63, in the case of detecting a high brightness object image from the captured image data, outputs information indicating the positional coordinates of the high brightness object image in the captured image data to the projection data generation unit 62.

The projection data generation unit 62, based on the positional coordinate information of the high brightness object image input from the object image detection unit 63, generates the anti-glare image data for projecting ultraviolet light to a region on the combiner 2 corresponding to the high brightness object image and outputs the anti-glare image data to the second drive unit 55.

The second drive unit 55 drives the optical modulation device 54 in accordance with the anti-glare image data input from the projection data generation unit 62 to project ultraviolet light to the region of the combiner 2 corresponding to the high brightness object image.

Figure 4:
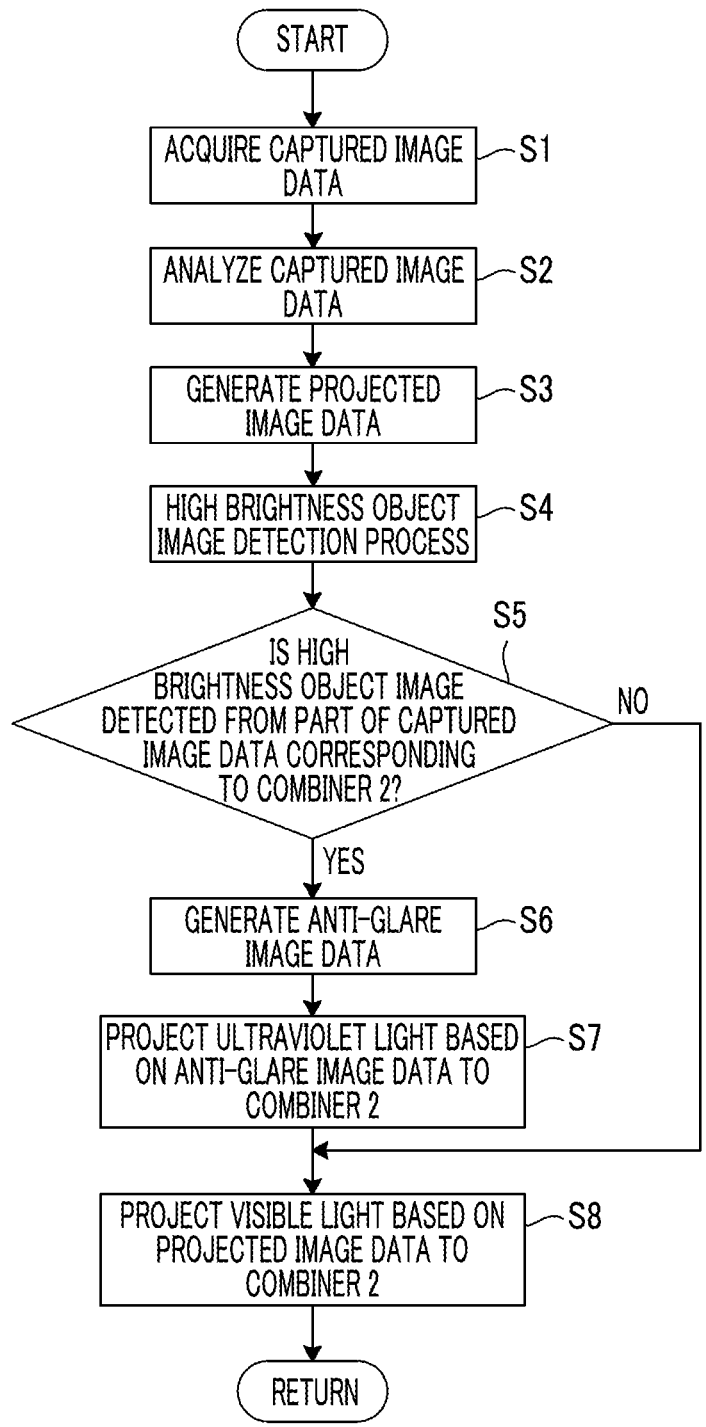
FIG. 4 is a flowchart for describing operation of the HUD illustrated in FIG. 1.

FIG. 4 is a flowchart for describing operation of the HUD illustrated in FIG. 1.

If the HUD is started, the captured image data acquisition unit 61 acquires the captured image data imaged in the imaging unit 9 (Step S1).

Next, the projection data generation unit 62 analyzes the captured image data acquired in the captured image data acquisition unit 61 (Step S2) and generates projected image data based on the analysis result (Step S3).

For example, in the case of the captured image data being analyzed as having a pedestrian as an obstacle or a dangerous object, projected image data for reporting existence of the pedestrian and the position of the existence is generated. In addition, the projection data generation unit 62 generates projected image data for displaying the traveling speed and navigation information of the automobile.

The object image detection unit 63 performs a process of detecting a high brightness object image having brightness of greater than or equal to the first threshold from the captured image data acquired in the captured image data acquisition unit 61 (Step S4). In the case of detecting a high brightness object image in the process of Step S4 (Step S5: YES), the projection data generation unit 62 generates the anti-glare image data based on the positional coordinates of the detected high brightness object image (Step S6).

Next, the projection data generation unit 62 inputs the anti-glare image data generated in Step S6 into the second drive unit 55. The second drive unit 55 drives the optical modulation device 54 in accordance with the input anti-glare image data to modulate ultraviolet light emitted from the second light source unit 50. By this modulation, ultraviolet light that is based on the anti-glare image data is projected to the combiner 2 (Step S7).

Accordingly, the light transmittance of the combiner 2 is locally decreased in the region to which the ultraviolet light is projected and is not changed in the other region. Thus, in the state of light being reduced in only a part of the high brightness object, it is possible to prevent high brightness external light from entering the eyes of the operator without hindering the front field of view of the operator.

Next, the projection data generation unit 62 inputs the projected image data generated in Step S3 into the first drive unit 45. The first drive unit 45 drives the optical modulation device 44 in accordance with the projected image data input from the projection data generation unit 62 to modulate light emitted from the first light source unit 40. By this modulation, an image that is based on the projected image data is projected to the combiner 2 (Step S8).

This image is, for example, an alert mark for reporting existence of a pedestrian, a box image indicating the position of a pedestrian, or an image indicating the traveling speed and navigation information of the automobile.

In the case of a high brightness object image not being detected in the process of Step S4 (Step S5: NO), the process of Step S8 is performed. After the process of Step S8, a return is made to Step S1.

As described above, according to the HUD illustrated in FIG. 1, in the case of existence of a high brightness object such as the sun or a headlight of an oncoming car within the field of view that is seen through the combiner 2 from the operator, ultraviolet light is projected to only a part of the high brightness object, and the light transmission of the part is decreased. Consequently, a large part of light of the high brightness object does not reach the eyes of the operator, and an anti-glare effect can be achieved.

Projection of ultraviolet light to the combiner 2 is stopped if the high brightness object is moved away from the field of view at the front of the windshield 1 and a high brightness object image is not detected from the range corresponding to the combiner 2 in the captured image data acquired by imaging in the imaging unit 9. Accordingly, the light transmittance of the range to which ultraviolet light is projected is instantaneously restored in the combiner 2. Thus, the operator can secure a favorable field of view and can continue on safe operation.

It is desirable that the size of the combiner 2 cover the entirety of the windshield 1. In addition, in the case of inability to secure, with one HUD, a region where the anti-glare effect can be expected, a plurality of HUDs may be used. Furthermore, using a wide-angle lens or a fisheye lens as an imaging lens mounted in the imaging unit 9 enables the scene at the front of the windshield 1 to be imaged in a wide range, and a high brightness object image can be accurately detected.

While the anti-glare image data is data for projecting ultraviolet light to the region of the combiner 2 corresponding to a high brightness object image, the anti-glare effect can also be achieved without projecting ultraviolet light to the entirety of the region.

Figure 5A:
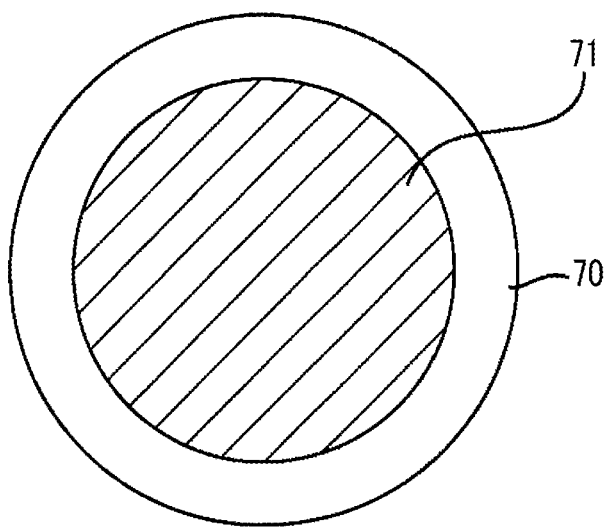
FIGS. 5A and 5B are diagrams illustrating a relationship between high brightness external light and a projection range of ultraviolet light projected to the combiner 2.
Figure 5B:
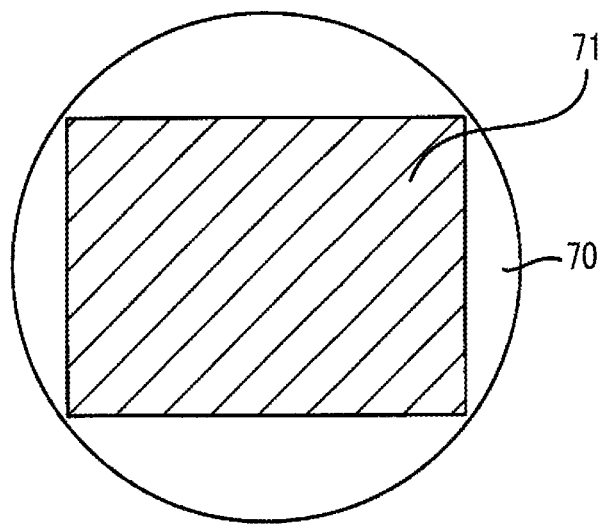

For example, as illustrated in FIGS. 5A and 5B, in the case of presence of a region 70 that corresponds to a high brightness object image in the combiner 2, a projection range 71 of ultraviolet light may be set inside of the region 70 and used as the anti-glare image data. That is, the anti-glare image data may be data for projecting ultraviolet light to at least a part of the region of the combiner 2 corresponding to a high brightness object image.

When ultraviolet light is projected to the combiner 2, it is preferable to control the range of projection of ultraviolet light in accordance with the area of the high brightness object image detected by the object image detection unit 63.

Specifically, the projection data generation unit 62, in the state of the area of the high brightness object image detected by the object image detection unit 63 being less than or equal to a second threshold, increases the range of projection of ultraviolet light as the area is increased, and in the state of the area being greater than or equal to the second threshold, fixes the projection range of ultraviolet light to the size in the state of the area of the high brightness object image reaching the second threshold.

In doing so, in the case of the high brightness object image having a significantly large area, an increase in the area of the range of the combiner 2 where light is reduced can be prevented, and the field of view can be secured. That is, the area of the region of the combiner 2 where light is reduced can be optimized within a range that does not hinder the front field of view of the operator.

A photochromic compound that exhibits a characteristic such that the light transmittance is decreased as the intensity of irradiation light of a specific wavelength is higher may also be used as the above photochromic compound coated on the combiner 2. In this case, the system control unit 60 may control the intensity of ultraviolet light projected to the combiner 2 in accordance with the area of the high brightness object image.

That is, the system control unit 60, in the state of the area of the high brightness object image detected by the object image detection unit 63 being less than the second threshold, fixes the intensity of ultraviolet light projected to the combiner 2 to a predetermined value regardless of the area and, in the state of the area of the high brightness object image being greater than or equal to the second threshold, sets the intensity of ultraviolet light projected to the combiner 2 below the value.

In doing so, in the case of the area of the high brightness object image having a significantly large area, the transmittance of visible light is increased in the region of the combiner 2 corresponding to the high brightness object image. Thus, a decrease in the light transmittance can be prevented in a wide range of the combiner 2, and the field of view can be secured. That is, the light transmittance of the combiner 2 can be optimized within a range that does not hinder the front field of view of the operator.

The system control unit 60 may control the intensity of ultraviolet light projected to the combiner 2 in accordance with the brightness of the high brightness object image.

That is, the system control unit 60 increases the intensity of ultraviolet light projected to the combiner 2 as the brightness of the high brightness object image detected by the object image detection unit 63 is higher.

In doing so, as the brightness of the high brightness object image is higher, the light transmittance of the combiner 2 can be significantly decreased, and the anti-glare effect can be increased.

Control of the intensity of ultraviolet light projected to the combiner 2 can be realized by controlling the amount of ultraviolet light emitted from the ultraviolet light source 51 or controlling the light transmittance of pixels in the case of using a liquid crystal display device as the optical modulation device 54.

The projection range of visible light (a range to which information related to operation is projected) may overlap with the projection range of ultraviolet light in the combiner 2 depending on the position of the high brightness object existing at the front of the windshield 1.

In this case, it is desirable to increase the visibility of the information related to operation by the system control unit 60 changing the brightness or the color of visible light that is projected to a part, of the projection range of visible light projected to the combiner 2, overlapping with the projection range of ultraviolet light. Change of the brightness or the color can be realized by controlling the light transmittance of the pixels of the optical modulation device 44 or controlling the amount of light emitted from the first light source.

Alternatively, the system control unit 60, in the case of overlap between the projection range of visible light and the projection range of ultraviolet light, may increase the visibility of the information related to operation by moving the projection range of visible light, in accordance with the projected image data, to a part other than the projection range of ultraviolet light of the combiner 2.

Alternatively, a function of outputting the projected image data to a display unit mounted in the automobile (for example, a display unit in a center console) may be added to the HUD in FIG. 1, and the system control unit 60, in the case of overlap between the projection range of visible light and the projection range of ultraviolet light, may increase the visibility of the information related to operation by stopping projection of light corresponding to the projected image data to the combiner 2 and outputting the projected image data to the display unit mounted in the automobile to display, on the display unit, the image that is supposed to be projected to the combiner 2.

The configuration example in FIG. 1 is configured to guide visible light and ultraviolet light onto the same optical path by using a dichroic mirror. As a modification example, a configuration in which any one of the R light source 41$r$, the G light source 41$g$, and the B light source 41$b$ is replaced with the ultraviolet light source 51 may be employed. The projected image data for displaying the traveling speed, navigation information, and the like of the automobile is not required to be in full color. Changing one of the visible light sources to the ultraviolet light source can make the light source section 4 more compact. In addition, the configuration of the light source section 4 is simplified, and cost can be reduced.

The projection data generation unit 62 in FIG. 3 generates the anti-glare image data based on the positional coordinates of the high brightness object image. In order to further increase the anti-glare effect, the anti-glare image data may be generated by detecting the eyes of the operator and using positional information of the detected eyes.

For example, an imaging unit that images a face of the operator is disposed near an operating seat (for example, a handle part). The system control unit 60 performs a process of detecting eyes from the face image of the operator acquired by imaging in the imaging unit. The projection data generation unit 62 calculates a relative positional relationship between the eyes of the operator and the high brightness object image from the position of the detected eyes of the operator and the positional coordinates of the high brightness object image, determines a projection position in which light from the high brightness object image is most unlikely to enter the eyes of the operator, and generates the anti-glare image data for projecting ultraviolet light to the projection position. In doing so, the anti-glare effect can be increased.

As described thus far, the following matters are disclosed in the present specification.

The projection type display device disclosed includes the first light source and the second light source, the projection unit that projects light, of light emitted from the first light source, corresponding to image information and light of a specific wavelength emitted from the second light source to the projection receiving member which is disposed on a windshield of a vehicle and of which the light transmittance is decreased by irradiation with the light of the specific wavelength, and the detection unit that detects an object image having brightness greater than or equal to the first threshold from a part, of captured image data acquired by imaging by an imaging unit which performs imaging in a traveling direction of the vehicle, corresponding to a range where the projection receiving member is disposed, in which the projection unit projects the light of the specific wavelength to at least a part of a region of the projection receiving member that corresponds to the object image detected by the detection unit.

In the projection type display device disclosed, the projection unit controls a range of projection of the light of the specific wavelength in accordance with the area of the object image detected by the detection unit.

In the projection type display device disclosed, the projection unit, in the state of the area of the object image detected by the detection unit being less than the second threshold, increases the range of projection of the light of the specific wavelength as the area is increased, and in the state of the area being greater than or equal to the second threshold, fixes the range to a size in the state of the area of the object image reaching the second threshold.

In the projection type display device disclosed, the light transmittance of the projection receiving member is decreased as the intensity of the light of the specific wavelength of irradiation is higher, and the projection unit controls the intensity of the light of the specific wavelength in accordance with the area of the object image detected by the detection unit.

In the projection type display device disclosed, the projection unit, in the state of the area of the object image detected by the detection unit being less than the second threshold, sets the intensity of the light of the specific wavelength to a predetermined value and, in the state of the area being greater than or equal to the second threshold, sets the intensity of the light of the specific wavelength below the predetermined value.

In the projection type display device disclosed, the projection unit controls the intensity of the light of the specific wavelength in accordance with the brightness of the object image detected by the detection unit.

In the projection type display device disclosed, in the case of overlap between the projection range of the light corresponding to the image information and the projection range of the light of the specific wavelength, the projection unit changes the brightness or the color of a part, of the light corresponding to the image information, that overlaps with the projection range of the light of the specific wavelength.

In the projection type display device disclosed, in the case of overlap between the projection range of the light corresponding to the image information and the projection range of the light of the specific wavelength, the projection unit moves the projection range of the light corresponding to the image information to a part, of the projection receiving member, other than the projection range of the light of the specific wavelength.

In the projection type display device disclosed, in the case of overlap between the projection range of the light corresponding to the image information and the projection range of the light of the specific wavelength, the projection unit stops projection of the light corresponding to the image information to the projection receiving member and outputs the image information to the display unit mounted in the vehicle to display the image information on the display unit.

The projection type display device disclosed further includes the projection receiving member.

A projection display method disclosed includes a projection step of projecting light, of light emitted from the first light source, corresponding to image information and light of a specific wavelength emitted from the second light source to the projection receiving member which is disposed on the windshield of the vehicle and of which the light transmittance is decreased by irradiation with the light of the specific wavelength, and a detection step of detecting an object image having brightness greater than or equal to the first threshold from a part, of captured image data acquired by imaging by the imaging unit which performs imaging in the traveling direction of the vehicle, corresponding to a range where the projection receiving member is disposed, in which in the projection step, the light of the specific wavelength is projected to at least a part of a region of the projection receiving member that corresponds to the object image detected in the detection step.

In the projection display method disclosed, in the projection step, the range of projection of the light of the specific wavelength is controlled in accordance with the area of the object image detected in the detection step.

In the projection display method disclosed, in the projection step, in the state of the area of the object image detected in the detection step being less than the second threshold, the range of projection of the light of the specific wavelength is increased as the area is increased, and in the state of the area being greater than or equal to the second threshold, the range is fixed to a size in the state of the area of the object image reaching the second threshold.

In the projection display method disclosed, the light transmittance of the projection receiving member is decreased as the intensity of the light of the specific wavelength of irradiation is higher, and in the projection step, the intensity of the light of the specific wavelength is controlled in accordance with the area of the object image detected in the detection step.

In the projection display method disclosed, in the projection step, in the state of the area of the object image detected by the detection unit being less than the second threshold, the intensity of the light of the specific wavelength is set to a predetermined value, and in the state of the area being greater than or equal to the second threshold, the intensity of the light of the specific wavelength is set below the predetermined value.

In the projection display method disclosed, in the projection step, the intensity of the light of the specific wavelength is controlled in accordance with the brightness of the object image detected in the detection step.

In the projection display method disclosed, in the case of overlap between the projection range of the light corresponding to the image information and the projection range of the light of the specific wavelength, in the projection step, the brightness or the color of a part, of the light corresponding to the image information, that overlaps with the projection range of the light of the specific wavelength is changed.

In the projection display method disclosed, in the case of overlap between the projection range of the light corresponding to the image information and the projection range of the light of the specific wavelength, in the projection step, the projection range of the light corresponding to the image information is moved to a part, of the projection receiving member, other than the projection range of the light of the specific wavelength.

In the projection display method disclosed, in the case of overlap between the projection range of the light corresponding to the image information and the projection range of the light of the specific wavelength, in the projection step, projection of the light corresponding to the image information to the projection receiving member is stopped, and the image information is output to the display unit mounted in the vehicle and displayed on the display unit.

The projection type display device of the present invention achieves high convenience and effectiveness by being mounted in, particularly, an automobile.

While the present invention is described thus far by a specific embodiment, the present invention is not limited to this embodiment, and various modifications can be carried out thereto to the extent not departing from the technical idea of the invention disclosed. The present application is based on JP2015-056436 filed on Mar. 19, 2015, the content of which is incorporated herein.

What is claimed is:

1. A projection type display device comprising:
    a first light source that emits visible light;
    a projection receiving member which is directly disposed on a windshield of a vehicle, to which an image based on the visible light is projected;
    a second light source that emits ultraviolet light which decreases a light transmittance of the projection receiving member by irradiation of the projection receiving member;
    a projector that projects the visible light emitted from the first light source and the ultraviolet light emitted from the second light source to the projection receiving member;
    an imager that performs imaging of a scene at front of the windshield of the vehicle; and
    a controller that detects an object image having brightness greater than or equal to a first threshold from a part, of captured image data of the scene acquired by directly imaging by the imager, corresponding to a range where the projection receiving member is disposed,
    wherein the projector projects the ultraviolet light to at least a part of a region of the projection receiving member that corresponds to the object image detected by the controller, and
    wherein the projector, imager, and controller are implemented as hardware.

2. The projection type display device according to claim 1,
    wherein the projector controls a range of projection of the ultraviolet light in accordance with an area of the object image detected by the controller.

3. The projection type display device according to claim 2,
    wherein the projector, in a state of the area of the object image detected by the controller being less than a second threshold, increases the range of projection of the ultraviolet light as the area is increased, and in a state of the area being greater than or equal to the second threshold, fixes the range to a size in a state of the area of the object image reaching the second threshold.

4. The projection type display device according to claim 1,
    wherein the light transmittance of the projection receiving member is decreased as an intensity of the ultraviolet light of irradiation is higher, and
    the projector controls the intensity of the ultraviolet light in accordance with an area of the object image detected by the controller.

5. The projection type display device according to claim 4,
    wherein the projector, in a state of the area of the object image detected by the controller being less than a second threshold, sets the intensity of the ultraviolet light to a predetermined value and, in a state of the area being greater than or equal to the second threshold, sets the intensity of the ultraviolet light below the predetermined value.

6. The projection type display device according to claim 1,
    wherein the projector controls an intensity of the ultraviolet light in accordance with the brightness of the object image detected by the controller.

7. The projection type display device according to claim 1,
    wherein in a case of overlap between a projection range of visible light projecting the image and a projection range of the ultraviolet light, the projector changes brightness or color of a part, of the visible light projecting the image, that overlaps with the projection range of the ultraviolet light.

8. The projection type display device according to claim 1,
    wherein in a case of overlap between a projection range of the visible light projecting the image and a projection range of the ultraviolet light, the projector moves the projection range of the visible light to a part, of the projection receiving member, other than the projection range of the ultraviolet light.

9. The projection type display device according to claim 1,
    wherein in a case of overlap between a projection range of the visible light projecting the image and a projection range of the ultraviolet light, the projector stops projection of the visible light to the projection receiving member and outputs the image to a display unit mounted in the vehicle to display the image on the display unit.

10. A projection display method comprising:
    a projection step of projecting visible light emitted from a first light source to a projection receiving member which is directly disposed on a windshield of a vehicle thereby projecting an image based on the visible light to the projection receiving member;
    a detection step of performing direct imaging of a scene at front of the windshield of the vehicle by an imager, and detecting an object image having a brightness greater than or equal to a first threshold from a part, of captured image data of the scene, corresponding to a range where the projection receiving member is disposed; and
    an anti-glare step of decreasing a light transmittance of the projection receiving member by projecting ultraviolet light emitted from a second light source to at least a part of a region of the projection receiving member corresponding to the object image detected by the detection step.

11. The projection display method according to claim 10,
    wherein in the anti-glare step, a range of projection of the ultraviolet light is controlled in accordance with an area of the object image detected in the detection step.

12. The projection display method according to claim 11,
    wherein in the anti-glare step, in a state of the area of the object image detected in the detection step being less than a second threshold, the range of projection of the ultraviolet light is increased as the area is increased, and in a state of the area being greater than or equal to the second threshold, the range is fixed to a size in a state of the area of the object image reaching the second threshold.

13. The projection display method according to claim 10,
wherein the light transmittance of the projection receiving member is decreased as an intensity of the ultraviolet light of irradiation is higher, and in the anti-glare step, the intensity of the ultraviolet light is controlled in accordance with an area of the object image detected in the detection step.

14. The projection display method according to claim 13,
wherein in the anti-glare step, in a state of the area of the object image detected in the detection step being less than a second threshold, the intensity of the ultraviolet light is set to a predetermined value, and in a state of the area being greater than or equal to the second threshold, the intensity of the ultraviolet light is set below the predetermined value.

15. The projection display method according to claim 10,
wherein in the anti-glare step, an intensity of the ultraviolet light is controlled in accordance with the brightness of the object image detected in the detection step.

16. The projection display method according to claim 10,
wherein in a case of overlap between a projection range of the visible light projecting the image and a projection range of the ultraviolet light, in the projection step, brightness or color of a part, of the visible light projecting the image, that overlaps with the projection range of the ultraviolet light is changed.

17. The projection display method according to claim 10,
wherein in a case of overlap between a projection range of the visible light projecting the image and a projection range of the ultraviolet light, in the projection step, the projection range of the visible light is moved to a part, of the projection receiving member, other than the projection range of the ultraviolet light.

18. The projection display method according to claim 10,
wherein in a case of overlap between a projection range of the visible light projecting the image and a projection range of the ultraviolet light, in the projection step, projection of the visible light to the projection receiving member is stopped, and the image is output to a display unit mounted in the vehicle and displayed on the display unit.

* * * * *